United States Patent Office 3,433,674
Patented Mar. 18, 1969

3,433,674
STORAGE BATTERY PLATES AND METHOD
OF MANUFACTURE
Giles S. Lello, Milwaukee, Wis., assignor to Globe Union
Inc., Milwaukee, Wis., a corporation of Delaware
No Drawing. Filed May 23, 1967, Ser. No. 640,474
U.S. Cl. 136—26                                    9 Claims
Int. Cl. H01m 39/04

ABSTRACT OF THE DISCLOSURE

A dry activated negative plate for a dry charge battery of the lead-acid type comprising a spongy particulate lead mass, the individual particles of which are coated with a composition of liquid poly-α-methylstyrene and polybutene, and a method of manufacturing the same.

---

This invention relates to improvements in battery manufacture and more particularly to lead-acid storage batteries of high resistance to oxidation and to methods for achieving the same.

The dry charged lead-acid type storage battery has been in use for a considerable period of time. In conventional practice the dry charged cell is stored until ready for use, at which time the electrolyte is added. During the storage period the negative plate of the battery is in contact with the atmosphere. Oxygen from the atmosphere reacts with and oxidizes the negative plates of the battery which are essentially a pure sponge lead. Oxidation of the sponge lead in the negative plates proceeds rapidly with a concomitant loss of charge which would otherwise be present at the time of addition of electrolyte. Obviously, such oxidation and loss of charge defeats the purpose of the dry charged battery. Without suitable precautions the normal storage of dry charge batteries in service stations, warehouses or the like, results in substantial deterioration of the charge at the time of installation.

Several expedients have been adopted in the prior art to eliminate this problem. One such procedure involves coating of the particles of sponge lead which make up the negative plate with a protective film which is relatively impervious to elements of the atmosphere which atmospheric components contribute to oxidation and loss of charge by reacting with the sponge lead. The protective film is hopefully such that while it acts as a barrier to oxidizing and other deleterious elements of the atmosphere, it is at the same time permeable to the electrolyte when the electrolyte is added to the battery just prior to use.

Petroleum fractions, such as lubricating oil or mineral oil of certain specific characteristics, have been used as protective films for these purposes as disclosed in U.S. Patent No. 3,198,665. However, while achieving some improvement in oxidation resistance, the results have not been optimum.

The use of chemical oxidation inhibitors in the negative plates has likewise been an expedient practiced in this art, but while osme beneficial results have been obtained, the use of oxidation inhibitors has not been acceptable to the industry as a solution to this problem.

It can be appreciated that the use of petroleum fractions inherently creates problems and difficulties. One of the difficulties in the use of this type of material is that it contains a mixture of materials including paraffins, aromatics, subsituted aromatics, polynuclear aromatics, polycyclics, unsaturated olefinic materials and the like. These materials, by their very nature, are heterogeneous substances or mixtures. It is well known that certain of the organic compounds in such mixtures are themselves susceptible to oxidation especially in the presence of metals. Especially noteworthy in this respect are olefinic materials, certain substituted aromatics and polyaromatics.

Obviously, petroleum fractions which can be used vary widely in components depending on their origin. The performance of the resultant mixtures is also likely to vary in direct relation to the amount of oxidizable material which is present in the mixture and the susceptibilty of the various components to oxidation. It is well known in the petroleum art that oxidation of some petroleum fraction results in resins, tars, and various materials which could well interfere with the flow of electrolyte or reduce the capacity of the material to function as a barrier coating around the particles of sponge lead.

It would therefore be desirable to provide a composition for use in treating or coating the particles of sponge lead in dry charge lead-acid batteries which would have a homogeneous known composition of oxidation resistant materials and which would provide a barrier to passage of deleterious elements of the atmosphere such as oxygen to the sponge lead of the negative battery plate and at the same time would be compatible with and permeable to the electrolyte.

Accordingly in one broad form the present invention comprises a battery plate composition comprising a mixture of synthetic liquid polymeric α-methylstyrene and polybutene in admixture with the basic lead sulfate.

Another broad form of this invention is a method of increasing oxidation resistance of sponge lead negative plates of lead-acid storage batteries which comprises admixing a composition of liquid α-methylsytrene polymer and liquid polybutene with a lead oxide, acid and water, to provide a battery paste, forming a negative plate for a battery from said admixture and electrochemically converting said admixture to sponge lead.

As indicated above, the polymeric materials utilized in the process of the present invention are low molecular weight liquids. Generally they are prepared by polymerization of α-methyl styrene in the one case or 1-butene in the other case, to a molecular weight sufficient to provide a relatively free flowing liquid which is readily admixed with the other components used in forming the negative plates of dry charge batteries. Generally the poly-α-methyl styrene should have a boiling point range of from about 550 to about 1000° F., and the poly-1-butene a boiling point range of from about 350 to about 600° F., with the major proportion (75 to 95%) boiling in the range of 350 to 540° F.

While the quantities of these materials may vary good results are obtained by the use of at least about 0.1% of the mixture of poly-α-methyl styrene and poly-1-butene. Generally a preferred result will be obtained by the addition of at least 0.2% of these materials. The additives to the paste mixture may be as high as about 4% by weight based on lead oxide, although no particular benefit is obtained by the use of excessive amounts. In this connection it should be understood that the percentages recited herein are based on lead oxide. The poly-1-butene may be present in amounts of from about 5 to 0.25 parts per part of poly-α-methylstyrene.

The following examples will illustrate the preparation of paste and formation of negative battery plates for dry charge storage batteries using the principles of the present invention. The results obtained in the tables illustrate the inhibition of lead oxide formation by the use of these materials and the percentage of charge retained on storage of the dry charged plates under accelerated conditions.

Examples

A basic mix of 1200 lbs. of lead oxide, 19 pounds of expander (carbon black), 57 liters of water, 50 liters of sulfuric acid (specific gravity 1.325) and additive as indicated, were used in preparing the compositions for the examples.

The proportions of the components are as follows: The plates, when pasted on grids, dried and converted to sponge lead by electrolytic processing, were checked for PbO content. The plates were then stored at 80% relative humidity and 80° F. It has been determined that storage for 1 week under those conditions as equivalent to one month's normal storage of a completely assembled battery. Storage was for the time indicated.

TABLE I.—PbO DETERMINATIONS

| Example | Additive [1] | PbO increase, 8 weeks exposure 80% relative humidity at 80° F.[2] |
|---|---|---|
| Control | None | 18.5 |
| 1 | .1% poly-α-methylstyrene, .1% polybutene | 5.5 |
| 2 | .1% poly-α-methylstyrene, .2% polybutene | 3.0 |

[1] Percentages are based on original lead oxide in formation of paste.
[2] Percentages are based on control without additive.

TABLE II

| Example | Additive [1] | Percent of full capacity at 12 weeks of unprotected storage in 80% humidity at 80° F. |
|---|---|---|
| Control | No additive | 0.00 |
| 1 | .1% liquid alpha-methylstyrene polymer, .1% polybutene | 100 |
| 2 | .2% liquid alpha-methylstyrene polymer, .1% polybutene | 100 |

[1] Percentages are based on original lead oxide in formation of paste.

The foregoing examples illustrate that the use of the combination of liquid polymeric compositions of poly-α-methylstyrene and polybutene in the production of charged negative plates for use in dry charge batteries results in greatly improved resistance to oxidation of the sponge lead component of said negative plates. The direct result of the reduction of normal oxidation is the retention of an essentially full charge for an extended period.

Lead-acid batteries prepared using the dry charged negative plates manufactured in accordance with the teachings of this invention demonstrated cold capacities which were consistently 6 to 7% higher than batteries prepared from plates without additive. The 20 hour capacity yields also remained constant.

Additional benefits seen in the use of the polymeric additives are improved consistency of the paste in the manufacturing operation and improved sulfation resistance of the negative plate during storage as a wet battery.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:
1. A dry activated negative plate for a dry charged battery of the lead-acid type comprising a spongy particulate lead mass in grid plate form, the individual particles of which are coated with a composition of liquid poly-α-methylstyrene and liquid polybutene.
2. An activated plate according to claim 1 wherein the composition is present in an amount of at least 0.1% by weight of lead calculated as the oxide.
3. An activated plate according to claim 2 wherein the composition is of 0.1 to 4% by weight of lead calculated as the oxide.
4. An activated plate according to claim 1 wherein the composition is present in amounts of at least 0.2% by weight calculated on a lead oxide basis.
5. An activated plate according to claim 1 wherein the composition comprises from about 0.1 to 4% of an admixture of poly-α-methylstyrene and polybutene wherein the polybutene is present in an amount of from about 0.25 to 5 parts by weight per part of poly-α-methylstyrene, said percentage being based on lead calculated as the oxide.
6. A process for preparing a dry activated negative plate for a dry charged battery of the lead-acid type which comprises admixing lead oxide, sulfuric acid and a polymeric composition of liquid poly-α-methylstyrene and polybutene to form a plate pasting composition, applying said paste to plate grids and electrolytically converting the pasted grid to a sponge lead negative plate and separating the plate from the electrolyte.
7. A process according to claim 6 wherein the pasted grid is converted to a negative sponge lead plate in situ in an assembled electrolyte cell.
8. A process according to claim 6 wherein the polymeric composition is present in an amount of at least 0.1% by weight based on lead oxide.
9. A process according to claim 6 wherein the polymeric composition is present in an amount of from about 0.2 to 4% by weight based on lead oxide.

References Cited

UNITED STATES PATENTS 3,184,339  5/1965  Ellis ------------------ 136—6
3,318,794  5/1967  Kiyuhara et al. ------- 136—27

WINSTON A. DOUGLAS, Primary Examiner.

C. F. LE FEVOUR, Assistant Examiner.

U.S. Cl. X.R.

136—27, 120